United States Patent [19]

Peck

[11] Patent Number: 4,762,264

[45] Date of Patent: Aug. 9, 1988

[54] VAPOR PHASE SOLDERING SYSTEM

[75] Inventor: Douglas J. Peck, North Andover, Mass.

[73] Assignee: Dynapert-HTC Corporation, Farmington, Conn.

[21] Appl. No.: 95,485

[22] Filed: Sep. 10, 1987

[51] Int. Cl.⁴ .............................................. B23K 3/04
[52] U.S. Cl. .................................. 228/37; 228/180.1
[58] Field of Search ...................... 228/37, 40, 180.1, 8, 228/242, 264; 118/410, 411, 412; 425/140, 145, 148

[56] References Cited

U.S. PATENT DOCUMENTS

| | | | |
|---|---|---|---|
| Re. 30,399 | 9/1980 | Ammann et al. | 228/37 |
| 4,115,601 | 9/1978 | Ammann et al. | 228/180.1 |
| 4,315,042 | 2/1982 | Spigarelli | 228/37 |
| 4,612,712 | 9/1986 | Pescatore et al. | 228/180.1 |
| 4,676,069 | 6/1987 | Miyake | 228/180.1 |
| 4,681,250 | 7/1987 | Derrico | 228/180.1 |
| 4,692,114 | 9/1987 | Waldron et al. | 228/242 |
| 4,697,730 | 10/1987 | Spigarelli et al. | 228/40 |

Primary Examiner—M. Jordan
Attorney, Agent, or Firm—Spencer T. Smith

[57] ABSTRACT

A processing vessel has two adjacent tanks each holding different electronic liquids. When heated the first will generate saturated vapor having a temperature below the liquidus temperature of eutectic solder and the second, when heated, will generate saturated vapor having a temperature above the liquidus temperature of eutectic solder. Work product is sequentially passed through these vapors and is first preheated and then reflowed.

2 Claims, 1 Drawing Sheet

VAPOR PHASE SOLDERING SYSTEM

In a vapor phase processing system, a contained electronic liquid is heated by heaters located within the contained liquid to generate a zone of saturated vapor. Work product, such as a printed work board with surface mounted components, some having leads located thereon, is delivered into the vessel through a long inlet throat, is processed by the hot saturated vapor and then leaves the system through a long exit throat. The long throats are cooled to minimize the loss of vapor. The conveyor defines a continuous substantially horizontal path across the vessel.

In such vapor phase systems, the product encounters the vapor zone at a point in the inlet throat. Very rapid heating begins. Reflow temperature is then attained within the tank. It is during the reflow period that the asymmetric heating phenomena occurs between a surface mounted component lead and respective lands on the printed work board, causing solder migration up the lead and an inadequate solder joint.

It is an object of the present invention to reduce asymmetric heating thereby minimizing the problem of lead solder migration.

An advantage of the present invention is that by reducing the reflow time, the formation of intermetallics in the solder joint can be minimized.

Other objects and advantages of the present invention will become apparent from the following portion of the specification and from the following drawings which illustrate in accordance with the mandate of the patent statutes a presently preferred embodiment incorporating the principles of the invention.

BRIEF DESCRIPTION OF THE DRAWING

The sole FIGURE is a cross-sectional view of a vapor phase processing system made in accordance with the teachings of the present invention.

DESCRIPTION OF THE PREFERRED EMBODIMENT

Figure 1:
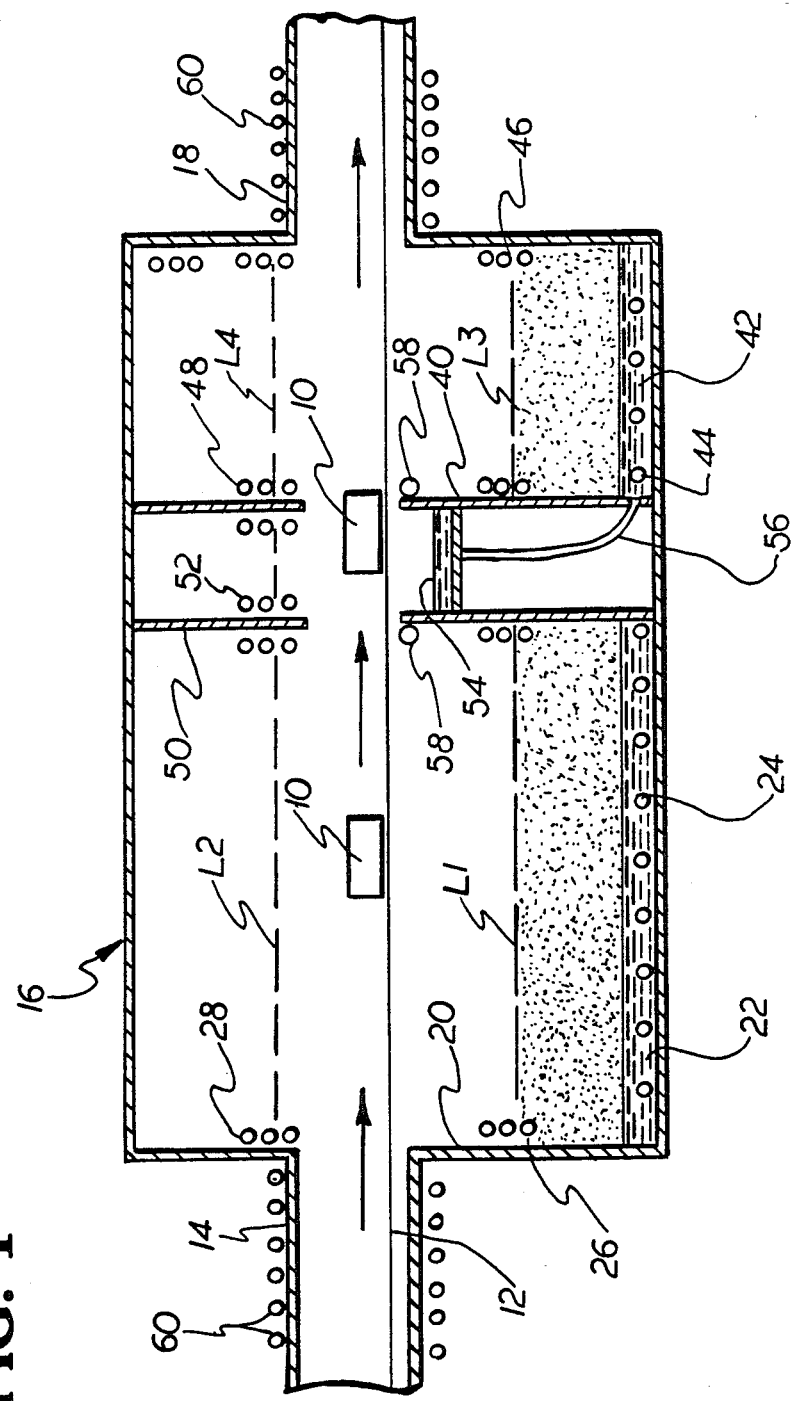

In the disclosed vapor phase soldering system, work product 10 is placed on a conveyor 12 which carries the product 10 through an inlet throat 14 and through the vessel 16 for processing and carries the processed work product 10 through the exit throat 18 to a pick-up location. The work product, which could be a printed circuit board having leaded surface mounted components placed on lands of the printed circuit board, initially enters a first tank 20 of the processing vessel which contains an electronic liquid 22. This liquid is heated by heaters 24 submerged in the liquid to generate saturated vapor having a temperature of approximately 300° to 350° F. (149° to 177° C.). This temperature is below the liquidus temperature of eutectic solder and accordingly work product will be preheated to approximately this temperature as it is conveyed through this first tank. The upper level of this saturated vapor can be defined at either a low level L1 below the work path by cycling cooling water through the lower cooling coils 26 or at an upper level L2 above the work product's path through the vessel by cycling cooling water only through the upper cooling coils 28 (cooling water may continuously be cycled through the upper coils 28).

The preheated product is then conveyed to a second tank 40 of the processing vessel which contains a different, higher boiling temperature electronic liquid 42. This liquid is heated by heaters 44 submerged in the liquid to generate saturated vapor having a nominal temperature of from 420° F. to 430° F. (215° to 221° C.). This temperature is above the liquidus temperature of eutectic solder and accordingly reflow will occur. (The width of this second tank 40 is chosen to just provide enough time for reflow to occur.) Since the work product is preheated, the width of the reflow tank 40 is much less than the width of the preheat tank 20. The level of vapor in this reflow tank can be defined at either a low level L3 below the work path by cycling cooling water through the lower cooling coils 46 or at an upper level L4 above the path by cycling cooling water only through the upper coils 48.

Between the preheat and reflow tanks is a third narrow holding tank 50 which includes upper cooling coils 52. These coils will condense any vapors which enter this vapor mixing tank from either the reflow 40 or preheat 20 tanks and condensate 54 will be collected at the bottom of this mixing tank, and drained back through a conduit 56 into either the preheat, the reflow tanks or a fluid separation chamber as desired. Additional cooling elements 58 may be located at the top of the exit wall of the preheat tank 20 and at the top of inlet wall of the reflow tank 40 to minimize flow of either the preheat or reflow vapors into this central tank 50 (the upper cooling coils 28, 48 of the preheat and reflow tanks being located at the bottom of these same walls).

I claim:

1. A vapor phase soldering system comprising
a processing vessel,
means for conveying work product which is to be soldered through said vessel,
said vessel including first and second processing chambers arranged in side by side relation along the work product path,
a first electronic liquid contained in said first chamber,
means for defining a zone of saturated vapor of said first electronic liquid in said first chamber to surround the work product,
the temperature of the first electronic liquid saturated vapor being selected to be lower than the liquidus temperature of eutectic and similar solder so that the work product to be soldered will be preheated, but not reflowed,
a second electronic liquid contained in said second chamber,
means for defining a zone of saturated vapor of said electronic liquid in said second chamber to surround the work product,
the temperature of the second electronic liquid saturated vapor being selected to be higher than the liquidus temperature of eutectic solder so that preheated work product can be soldered.

2. A vapor phase soldering system according to claim 1 further comprising
means for collecting condensate from the first and second electronic liquids and directing this collected condensate to either of the source tanks or to a liquid separation vessel.

* * * * *